(12) United States Patent
Kaneshige

(10) Patent No.: US 12,542,469 B2
(45) Date of Patent: Feb. 3, 2026

(54) MOTOR AND MOTOR SYSTEM

(71) Applicant: TOYOTA JIDOSHA KABUSHIKI KAISHA, Toyota (JP)

(72) Inventor: Keiichi Kaneshige, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 115 days.

(21) Appl. No.: 18/528,972

(22) Filed: Dec. 5, 2023

(65) Prior Publication Data

US 2024/0258873 A1    Aug. 1, 2024

(30) Foreign Application Priority Data

Jan. 27, 2023   (JP) .................................. 2023-011153

(51) Int. Cl.
*H02K 5/22*   (2006.01)
*H02K 9/19*   (2006.01)

(52) U.S. Cl.
CPC .............. *H02K 5/225* (2013.01); *H02K 9/19* (2013.01)

(58) Field of Classification Search
CPC ............ H02K 5/00; H02K 5/225; H02K 9/00; H02K 9/19
See application file for complete search history.

(56) References Cited

U.S. PATENT DOCUMENTS

| | | | | |
|---|---|---|---|---|
| 2005/0285457 | A1* | 12/2005 | Tsutsui | H02K 11/25 310/52 |
| 2011/0285220 | A1* | 11/2011 | Sonohara | H02K 9/00 310/53 |
| 2015/0084458 | A1* | 3/2015 | Tokunaga | H02K 5/225 310/71 |
| 2015/0295473 | A1* | 10/2015 | Suzuki | H02K 9/19 310/54 |

FOREIGN PATENT DOCUMENTS

| | | | |
|---|---|---|---|
| JP | 2007-159314 A | | 6/2007 |
| JP | 2010-141968 A | | 6/2010 |
| JP | 5256117 B2 | | 8/2013 |
| JP | 2013172486 A | * | 9/2013 |
| JP | 2013-220026 A | | 10/2013 |
| JP | 2021-064580 A | | 4/2021 |
| WO | WO-2018225877 A1 | * | 12/2018 ............... H02K 9/19 |

OTHER PUBLICATIONS

Machine Translation of WO 2018225877 A1 (Year: 2018).*
Machine Translation of JP 2013172486 A (Year: 2013).*

* cited by examiner

*Primary Examiner* — Alexander A Singh
*Assistant Examiner* — Charlie Frank Mann, Jr.
(74) *Attorney, Agent, or Firm* — SoraIP, Inc.

(57) ABSTRACT

The motor includes a case, a stator having a stator coil, a rotor facing the stator, and a terminal unit provided in an opening formed in the case. The terminal unit includes a main body and external connection terminals. A main body is fixed in the opening and is at least partially composed of (Continued)

an insulating material. The external connection terminals are held by the main body, extend inside and outside the case, and are electrically connected to the stator coil inside the case. The main body of the terminal unit is provided with an oil flow path. The oil flow path communicates the inside and outside of the case and is configured to supply oil to the inside of the case.

4 Claims, 4 Drawing Sheets

MOTOR AND MOTOR SYSTEM

CROSS-REFERENCE TO RELATED APPLICATION

This application claims priority to Japanese Patent Application No. 2023-011153 filed on Jan. 27, 2023, incorporated herein by reference in its entirety.

BACKGROUND

1. Technical Field

The technology disclosed in this specification relates to a motor and a motor system.

2. Description of Related Art

Japanese Unexamined Patent Application Publication No. 2010-141968 (JP 2010-141968 A) discloses a motor provided with a terminal unit. The terminal unit is provided with an external connection terminal and an oil flow path for cooling the external connection terminal. The oil supplied into a case of the motor is supplied to the oil flow path of the terminal unit after flowing along the outer peripheral surface of a stator.

SUMMARY

In the above motor, the oil after cooling the stator is supplied to the oil flow path of the terminal unit. Therefore, the temperature of the oil supplied to the terminal unit is relatively high, and the terminal unit cannot be sufficiently cooled. This specification provides a technology capable of stably cooling the terminal unit.

This specification discloses a motor including: a case;
a stator fixed in the case and having a stator coil;
a rotor rotatably supported in the case and facing the stator; and a terminal unit provided in an opening formed in the case.

The terminal unit includes a main body and an external connection terminal. The main body is fixed to the opening and at least partially composed of an insulating material. The external connection terminal is held by the main body. The external connection terminal extends inside and outside the case, and is electrically connected to the stator coil in the case. The main body of the terminal unit is provided with an oil flow path. The oil flow path is configured to communicate between an inside and an outside of the case, and supply oil to the inside of the case.

In the vehicle described above, the main body of the terminal unit is provided with an oil flow path that communicates between the inside and the outside of the case. This allows oil to be supplied directly from the outside of the case to the oil flow path of the terminal unit. The terminal unit can be stably cooled by supplying oil at a low temperature to the terminal unit.

Details and further improvements of the technology disclosed in this specification are described in the following "DETAILED DESCRIPTION OF EMBODIMENTS".

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In one embodiment of the present technology, the oil flow path may have an oil discharge port opening toward the stator coil within the case. The oil can cool the stator coil.

In one embodiment of the present technology, an oil pool having a locally enlarged cross-sectional area may be formed in an intermediate section of the oil flow path. It may be closer to the external connection terminal than other sections. With such a configuration, more oil can be supplied to and recovered from the external connection terminal that generates heat when energized. It can also effectively cool the external connection terminals that generate heat.

Also, a motor system comprising the motor described above and an oil supply device connected to the oil flow path outside the case for supplying oil to the oil flow path is also novel and useful.

First Embodiment

Figure 1:
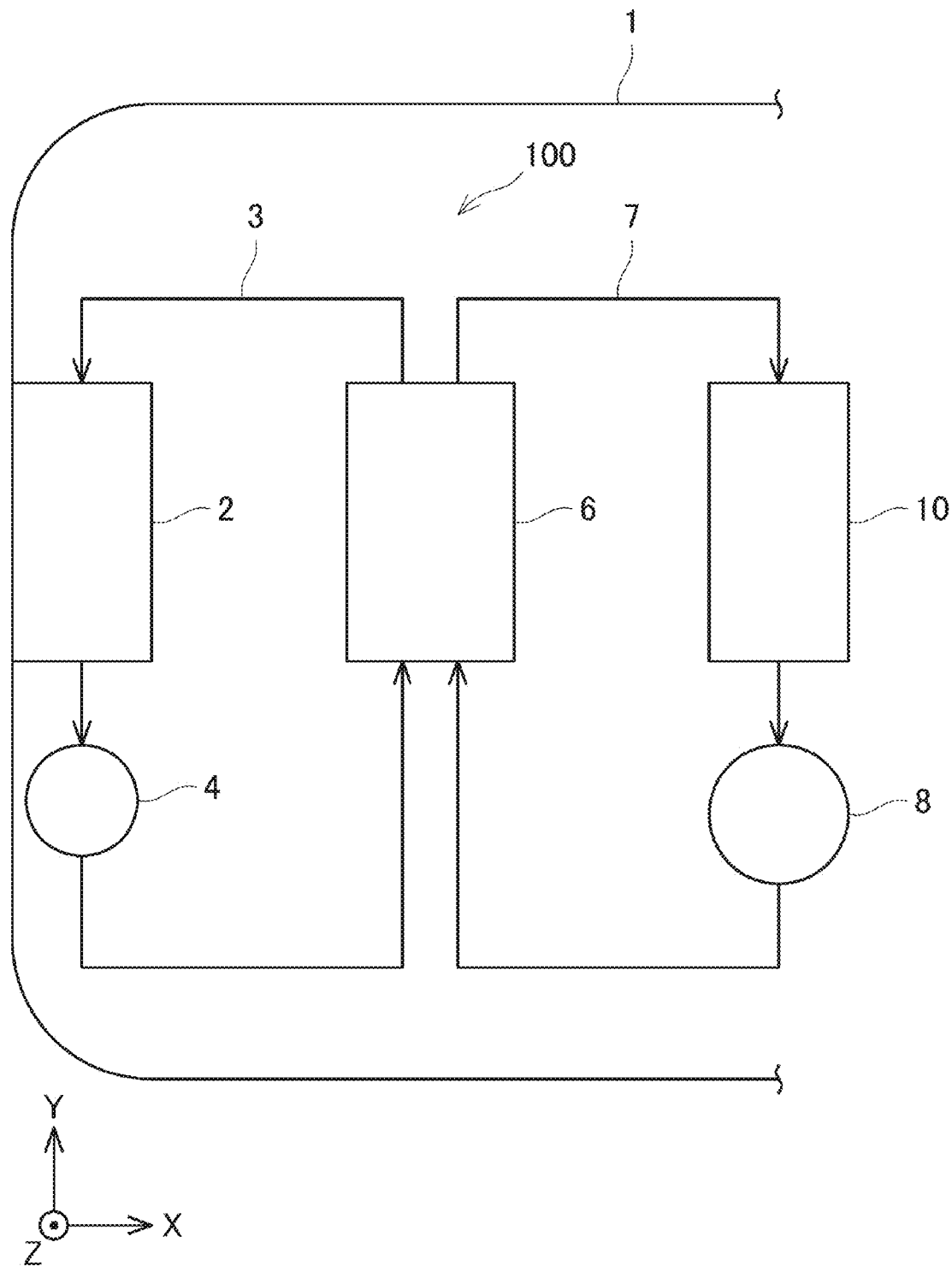
FIG. 1 shows a circuit diagram of the motor system 100 of the first embodiment.

FIG. 1 schematically shows a circuit diagram of the motor system 100 of the first embodiment. The motor system 100 is mounted on the front component of an electrified vehicle 1. The motor system 100 includes a radiator 2, a water pump 4, a refrigerant pipe 3, an oil cooler 6, an oil pump 8, an oil pipe 7, and a motor 10. The motor system 100 keeps the motor 10 at a proper temperature to operate the motor 10 properly. The coordinate axes in the figure indicate the directions from the perspective of the occupant seated in the driver's seat of electrified vehicle 1. That is, the positive side of the Z-axis indicates the upper side of the electrified vehicle 1 and the negative side of the Z-axis indicates the lower side. The positive side of the Y-axis indicates the right side of electrified vehicle 1, and the negative side of the Y-axis indicates the left side. The positive side of the X-axis indicates the rear side of electrified vehicle 1, and the negative side of the X-axis indicates the front side.

The radiator 2 is a device that exchanges heat between the refrigerant (for example, antifreeze) flowing through the refrigerant pipe 3 and the outside air. The radiator 2 is exposed at the front end of the electrified vehicle 1. Therefore, the radiator 2 can take in outside air while electrified vehicle 1 is traveling. Water pump 4 is a device that circulates the refrigerant in refrigerant pipe 3. Water pump 4 circulates the refrigerant in refrigerant pipe 3 to radiator 2 and oil cooler 6. The oil cooler 6 is a device that exchanges heat between the refrigerant in the refrigerant pipe 3 and the oil in the oil pipe 7.

The oil pump 8 is a device that circulates the oil in the oil pipe 7. The oil pump 8 circulates the oil in the oil pipe 7 in the order of the oil cooler 6 and the motor 10. Oil is cooled by the refrigerant at the oil cooler 6. The cooled oil is supplied to the motor 10.

Figure 2:
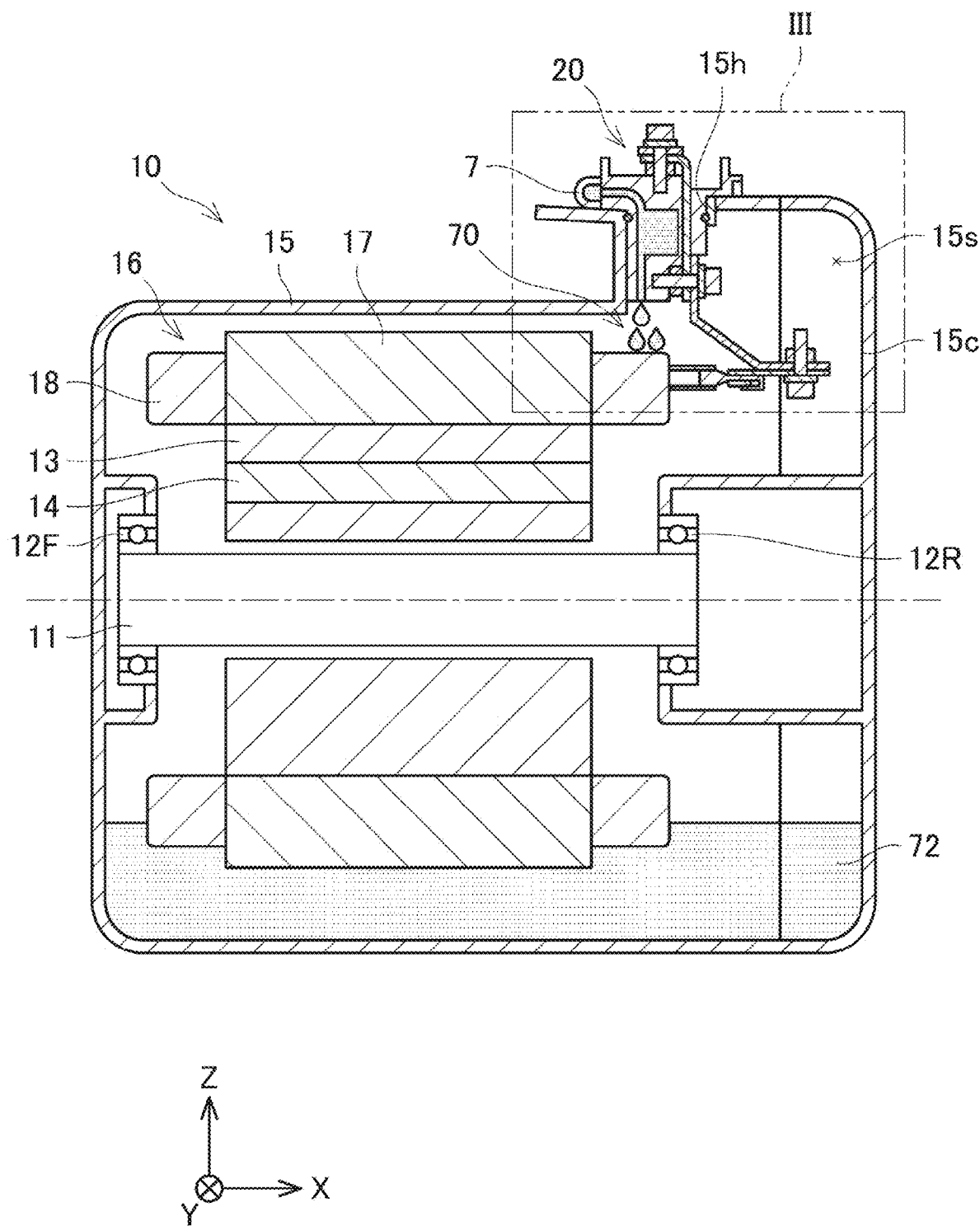
FIG. 2 shows a cross-sectional view of the motor 10 of the first embodiment.

A detailed structure of the motor 10 will be described with reference to FIG. 2. FIG. 2 is a sectional view of the motor 10 along a plane that passes through a rotation axis of the motor 10. The motor 10 includes a case 15, a shaft 11, a rotor 13, a stator 16, and a terminal unit 20. The motor 10 is a driving motor for the electrified vehicle 1, and is a so-called radial gap type motor. Further, the motor 10 also function as a power generator using regenerative energy of the electrified vehicle 1. The case 15 is made of, for example, aluminum. The case 15 forms an internal space 15s that accommodates the members 11, 13, and 16. The case 15 has a substantially cylindrical shape extending in an axial direction (that is, a right-left direction on FIG. 2). The case 15 has a cap 15c. The cap 15c is attached from behind (that is, the right side of the paper surface of FIG. 2) with the members 11, 13, 16, 20 accommodated in the case 15. Thus, an internal space 15s to accommodate the members 11, 13, 16, 20 is formed. An opening 15h is formed on the side surface (that is, on the upper surface in FIG. 2) of the case 15. The opening 15h penetrates the side wall of the case 15 and communicates the inside and outside of the case 15.

The shaft 11 is rotatably supported by the case 15 via a pair of bearings 12F and 12R. The shaft 11 passes through the rotor 13. The rotor 13 has a cylindrical shape and is formed by electromagnetic steel sheets (for example, silicon steel sheets) being laminated. A permanent magnet 14 is embedded in the rotor 13.

The stator 16 is fixed inside the case 15 and has a stator core 17 and a stator coil 18. The stator core 17 has a cylindrical shape. In a through hole of the stator core 17, the shaft 11 and the rotor 13 are disposed. The shaft 11, rotor 13 and stator core 17 are arranged so that their axes coincide. The stator core 17 faces the rotor 13 from radially outside of the rotor 13. As the rotor 13, the stator core 17 is formed by stacking steel plates (for example, silicon steel plates). Stator coils 18 are wound around the stator core 17 from both sides in the axial direction (that is, the left and right direction of the paper surface of FIG. 2). The stator coil 18 consists of three-phase (U-phase, V-phase, and W-phase) coil wires. The stator coil 18 is constructed by disposing the coil wire of each phase that is wound in a circumferential direction of the stator 16 in order, repeatedly (not shown).

When a current flows through the stator coil 18, a magnetic force is generated between the rotor 13 and the permanent magnet 14. This magnetic force causes the rotor 13 to rotate about the shaft 11. In this way, the rotor 13 is rotatably supported within the case 15. For the details of the technology for the motor 10 to rotate the rotor 13, see Since it is already known, the explanation is omitted.

The terminal unit 20 is fixed to the opening 15h of the case 15. The terminal unit 20 is connected to the oil pipe 7. Thereby, the oil 70 is supplied into the case 15 through the terminal unit 20. The oil 70 falls along the rear end of the stator coil 18, the bearing 12R, and the surface of the shaft 11. At this time, the oil 70 cools the stator coil 18, and the surface of the bearing 12R and the shaft 11 Reduces frictional forces, i.e. oil 70 cools stator coils 18. The oil 70 also functions as a lubricant for the bearing 12R and the shaft 11. When dropped on the bottom surface of the case 15, the oil 72 accumulates on the bottom surface of the case 15. The oil 72 accumulated on the bottom surface of the case 15 Pump 8 (see FIG. 1) pumps oil through oil pipe 7 to oil cooler 6. Oil cooled by oil cooler 6 is supplied again to case 15 through oil pipe 7 and terminal unit 20.

A detailed structure of the terminal unit 20 will be described with reference to FIGS. 3 and 4. The terminal unit 20 includes a main body 22, a first bus bar 24, a seal 26, and a second bus bar 42. The terminal unit 20 electrically connects the stator coil 18 inside the case 15 and the power line 40 outside the case 15. The power line 40 is connected to a battery (not shown) placed outside the case 15, for example.

The main body 22 is made of resin. The main body 22 is press-fitted into the opening 15h of the case 15 from above. The seal 26 is an O-ring that seals between the inner peripheral surface of the opening 15h of the case 15 and the outer peripheral surface of the main body 22 of the terminal unit 20. That is, the main body 22 of the terminal unit 20 is a member that closes the opening 15h of the case 15.

A first connecting member 19 is provided at the rear end of the stator coil 18. The front end of the first connecting member 19 is connected to the coil wire of the stator coil 18. A rear end of the first connecting member 19 is connected to a second connecting member 44. Each connecting member 19, 44 is made of a conductive material (for example, copper). The second connecting member 44 is connected to the second bus bar 42 by bolt B1 and nut N1.

The second bus bar 42 has a horizontal portion, an inclined portion and a vertical portion. The horizontal portion abuts the second connecting member 44. The slant part is displaced forward from the front end of the flat part. The vertical portion extends upward from the front end of the sloping portion. The second bus bar 42 is a flat plate-like member made of a conductive material (e.g., copper). The vertical portion of the second bus bar 42 is connected to the first bus bar 24 by bolt B1 and nut N1.

The first bus bar 24 has a lower holding portion, a body portion, and an upper holding portion. The lower holding portion comes into contact with the vertical portion of the second bus bar 42. The body part extends upward from the seat surface. The upper holding part bends forward at the upper end of the body part. A power line 40 is arranged on the upper surface of the upper holding portion of the first bus bar 24. The first bus bar 24 is fixed to the main body 22 by a bolt B1 and a nut N1. Like the second bus bar 42, the first bus bar 24 is also a flat plate-like member made of conductive material (for example, copper).

Figure 3:
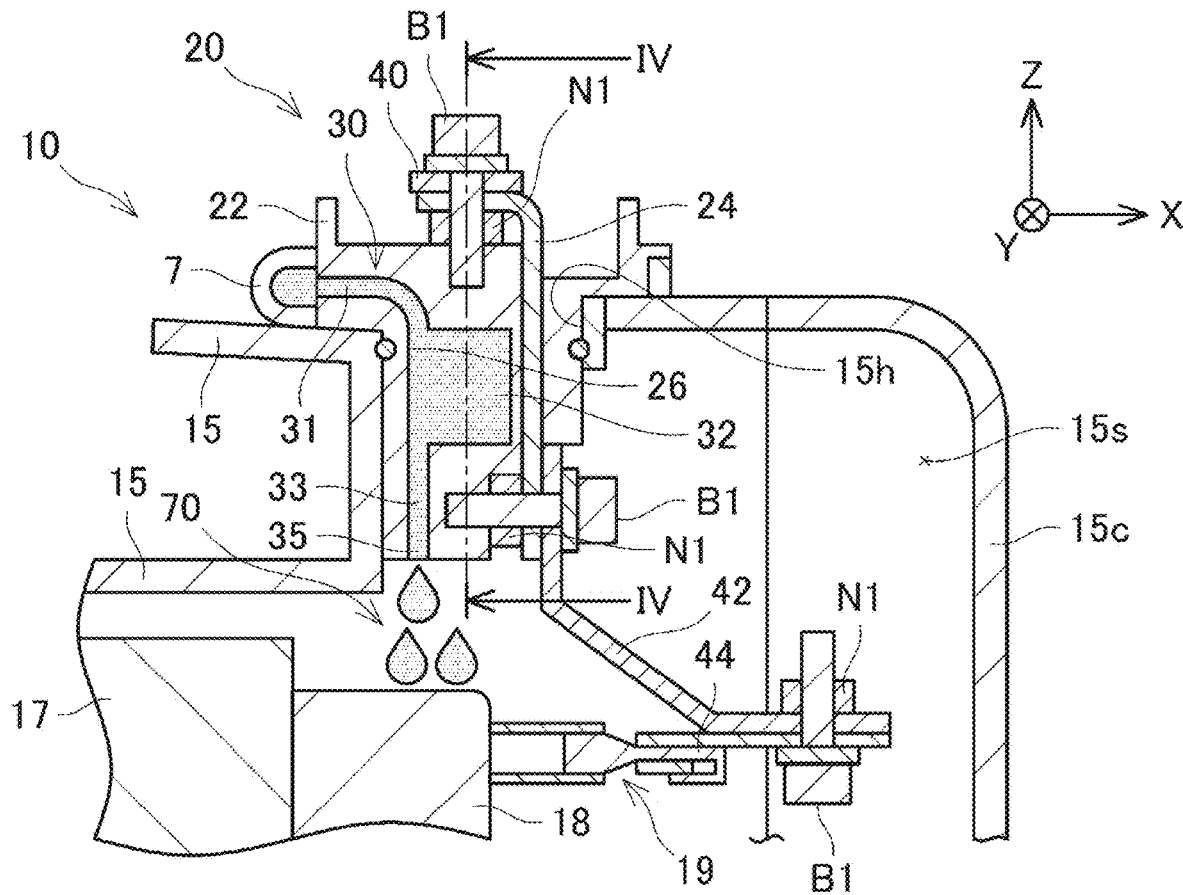
FIG. 3 shows an enlarged view of the area of line III of FIG. 2.
Figure 4:
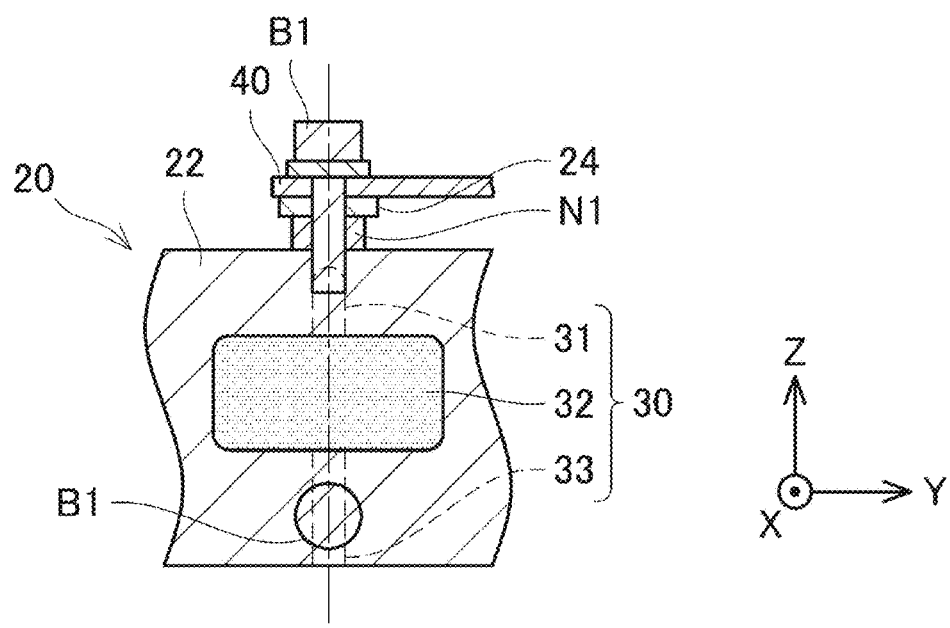
FIG. 4 shows a cross-sectional view along line IV-IV of FIG. 3.

As shown in FIG. 3, the first bus bar 24 penetrates the opening 15h of the case 15 and extends vertically. That is, the first bus bar 24 extends through inside and outside of the case 15. Also, the first bus bar 24 is connected to the second bus bar 42 within the case 15. As described above, the second bus bar 42 and each connecting member 19, 44 It is made of a conductive material. That is, the first bus bar 24 is electrically connected to the stator coil 18 inside the case 15.

High-voltage power flows through the connecting members 19, 44 and the bus bars 24, 42 electrically connected to the stator coil 18. When the high-voltage power flows, the connecting members 19, 44 and the bus bars 24, 42 generate heat.

An oil flow path 30 is provided in the main body 22 of the terminal unit 20. The oil flow path 30 has a first section 31, a second section 32, and a third section 33. The front end of the first section 31 is connected to the oil pipe 7, and the rear end of the first section 31 is connected to the second section 32. The second section 32 is connected to the first section 31 and the third section 33. That is, the second section 32 is located in the middle section of the oil flow path 30. The third section 33 extends downward from the lower end of the second section 32. The third section 33 of has an oil discharge port 35 opened inside the case 15. In this way, the oil flow path 30 communicates the inside and outside of the case 15. Thus, the oil 70 in the oil pipe 7 is supplied into the case 15 from the oil discharge port 35.

According to the motor 10 of this embodiment, the oil 70 in the oil pipe 7 outside the case 15 is directly supplied to the oil flow path 30 of the terminal unit 20. By supplying low temperature oil 70 to the terminal unit 20, the terminal unit 20 can be stably cooled. In addition, the end of the oil flow path 30 is opened toward the stator coil 18 as an oil discharge port 35. Therefore, the oil 70 that has passed through the oil flow path 30 is discharged toward the stator coil 18 and can further cool the stator coil 18.

Furthermore, as shown in FIG. 3, in the second section 32, the height of the oil flow path 30 is higher than the heights of the other sections 31 and 33. Here, the height of the oil flow path 30 shows the upward direction in a cross section perpendicular to the supply direction of the oil 70. It is the upward direction in FIG. 3 in the first section 31, and in the right direction in FIG. 3 in the second section 32 and the third section 33. Further, as shown in FIG. 4, in the second section 32, the width of the oil flow path 30 (that is, the length in the horizontal direction of the paper surface of FIG. 4) is greater than the widths of the other sections 31 and 33.

Therefore, the cross-sectional area of the second section 32 is larger than the cross-sectional areas of the other sections 31 and 33. Thus, the second section 32 has an oil pool with a locally enlarged cross-sectional area. It is formed Also, the height of the second section 32 is higher than the height of the third section 33. Therefore, the distance between the rear end of the second section 32 and the first bus bar 24 is equal to that of the other sections 31, 33 and the first bus bar 24. That is, the oil pool provided in the second section 32 is closer to the first bus bar 24 than the other sections 31 and 33.

Thus, by forming an oil pool in the second section 32 of the oil flow path 30, the amount of the oil 70 stored in the main body 22 of the terminal unit 20 is increased and the first bus bar 24, which is a heat source, and the oil flow path 30 can be brought close to each other, so that the terminal unit 20 can be cooled more efficiently.

Second Embodiment

Figure 5:
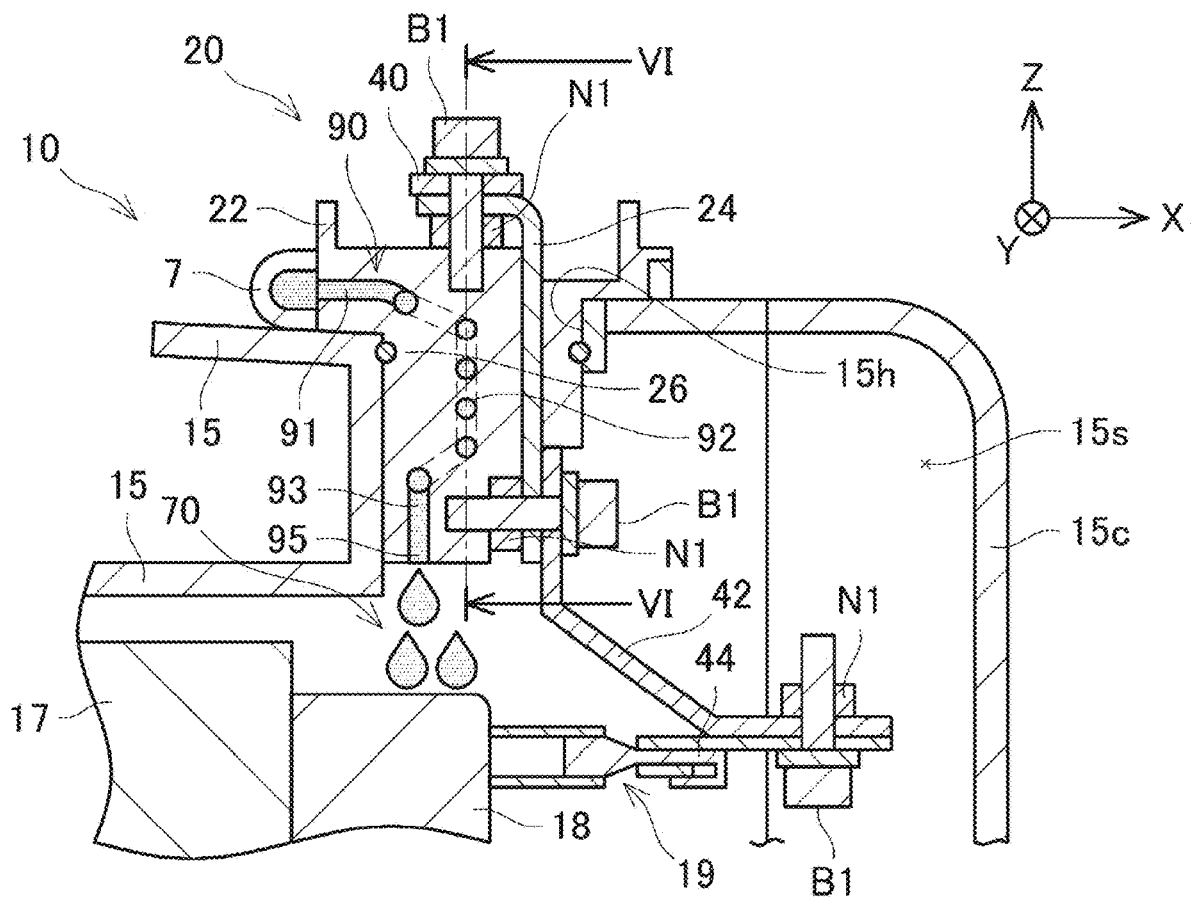
FIG. 5 shows an enlarged view of the same portion as FIG. 3 in the motor 10 of the second embodiment.

The motor 10 of the second embodiment will be described with reference to FIGS. 5 and 6. The terminal unit 20 of the motor 10 of the second embodiment has an oil flow path instead of the oil flow path 30 of the first embodiment. 90. However, in other respects, it has the same configuration.

An oil pool is not formed in the oil flow path 90 of the second embodiment. The oil flow path 90 has a supply flow path 91, a labyrinth flow path 92, and a discharge flow path 93. The supply flow path 91 is connected to oil pipe 7. The end of the discharge flow path 93 is open inside the case 15. The discharge flow path 93 has an oil discharge port 95 opened toward the stator coil 18.

Figure 6:
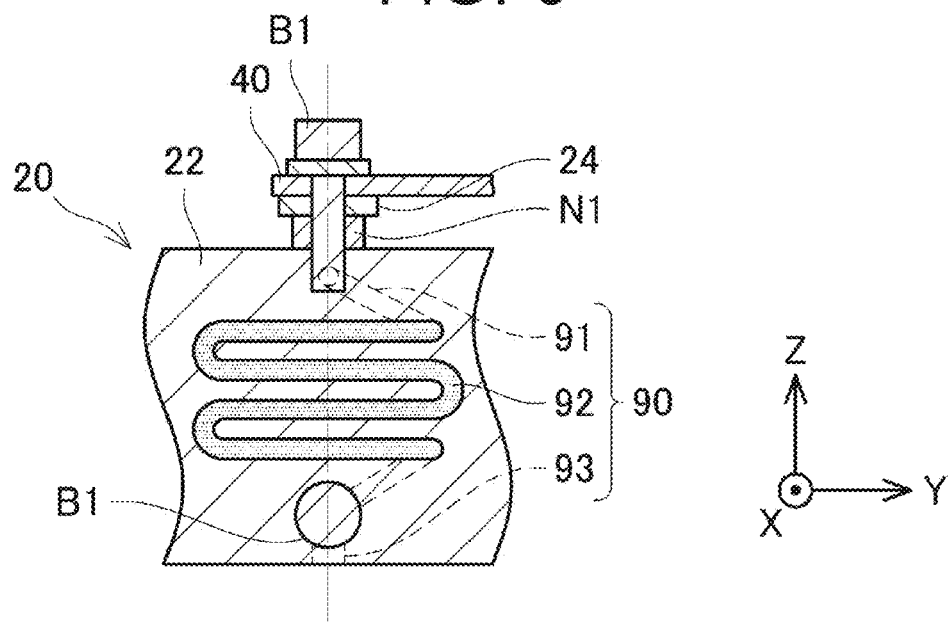
FIG. 6 shows a cross-sectional view along line VI-VI in FIG. 5.

As shown in FIG. 6, the labyrinth flow path 92 causes the oil 70 to meander. That is, the labyrinth flow path 92 makes the distance of the oil 70 flowing in the main body 22 of the terminal unit 20 long. Thus, the terminal unit 20 can be efficiently cooled without increasing the volume of the oil 70.

Specific examples of the technology disclosed in the present specification have been described in detail above, but these are merely examples and do not limit the scope of the claims. Various modifications and changes of the illustrated examples are included. Modified examples of the above examples are listed below.

Modification 1

The end of the oil flow path 30 of the first embodiment does not have to be open towards the stator coil 18 as the oil discharge port 35. For example, the oil discharge port 35 may be open towards the stator core 17. That is, the terminal unit 20 may not be provided at a position facing the axial end of the stator 16, and may be provided facing the axial center of the stator 16.

Modification 2

The oil flow path 90 of the second embodiment may not have the labyrinth flow path 92. In that case, the oil flow path 90 is connected to the oil pipe 7 and has a supply flow path extending in the front-rear direction and a supply flow path and a discharge flow path extending downward from the trailing end of the channel.

Modification 3

A plurality of oil flow paths may be formed in the main body 22 of the terminal unit 20.

Modification 4

The motor 10 may have multiple terminal units 20.

The technical elements described in the specification or the drawings exhibit technical usefulness alone or in various combinations, and are not limited to the combinations described in the claims at the time of filing. The technique illustrated in the document or drawings can achieve multiple purposes at the same time, and the achievement of one of them has technical utility in itself.

What is claimed is:

1. A motor comprising:
   a case;
   a stator fixed in the case and having a stator coil;
   a rotor rotatably supported in the case and facing the stator; and
   a terminal unit provided in an opening formed in the case, wherein:
   the terminal unit includes
      a main body fixed to the opening and at least partially composed of an insulating material, and
      an external connection terminal held by the main body, extending inside and outside the case, and electrically connected to the stator coil in the case;
   the main body of the terminal unit is provided with an oil flow path; and
   the oil flow path is configured to communicate between an inside and an outside of the case, and supply oil to the inside of the case.

2. The motor according to claim 1, wherein the oil flow path has an oil discharge port that opens toward the stator coil in the case.

3. The motor according to claim 1, wherein:
   an oil pool with a locally enlarged cross-sectional area is formed in an intermediate section of the oil flow path; and
   the oil pool is closer to the external connection terminal than other sections of the oil flow path.

4. A motor system comprising:
the motor according to claim 1; and
an oil supply device connected to the oil flow path outside the case to supply oil to the oil flow path.

* * * * *